United States Patent
Sharif et al.

(10) Patent No.: US 10,486,562 B2
(45) Date of Patent: Nov. 26, 2019

(54) ANTI-SUBMARINING SEAT STRUCTURE

(71) Applicant: Nissan North America, Inc., Franklin, TN (US)

(72) Inventors: Curtis Sharif, West Bloomfield, MI (US); Jeffery Dix, Commerce Township, MI (US)

(73) Assignee: Nissan North America, Inc., Franklin, TN (US)

( * ) Notice: Subject to any disclaimer, the term of this patent is extended or adjusted under 35 U.S.C. 154(b) by 120 days.

(21) Appl. No.: 15/697,690

(22) Filed: Sep. 7, 2017

(65) Prior Publication Data

US 2019/0070986 A1    Mar. 7, 2019

(51) Int. Cl.
| | |
|---|---|
| B60N 2/427 | (2006.01) |
| B60R 21/231 | (2011.01) |
| B60R 21/207 | (2006.01) |
| B60N 2/42 | (2006.01) |

(52) U.S. Cl.
CPC ....... B60N 2/42763 (2013.01); B60N 2/4221 (2013.01); B60N 2/4279 (2013.01); B60N 2/42718 (2013.01); B60R 21/207 (2013.01); B60R 2021/23107 (2013.01)

(58) Field of Classification Search
CPC ........ B60R 21/207; B60R 2021/23107; B60R 2021/01034; B60R 2021/01231; B60R 21/0134; B60N 2/42763; B60N 2/42718; B60N 2/4221; B60N 2/4263
USPC ............................................ 701/45; 280/735
See application file for complete search history.

(56) References Cited

U.S. PATENT DOCUMENTS

| | | | |
|---|---|---|---|
| 6,672,667 B1 | 1/2004 | Park | |
| 6,910,714 B2 * | 6/2005 | Browne | B60R 21/04 280/753 |
| 7,150,500 B2 * | 12/2006 | Hippel | B60N 2/0276 297/216.1 |
| 7,712,832 B2 * | 5/2010 | Booth | B60N 2/80 297/284.9 |
| 7,758,121 B2 | 7/2010 | Browne et al. | |
| 9,283,875 B1 * | 3/2016 | Pellettiere | A47C 27/083 |

(Continued)

FOREIGN PATENT DOCUMENTS

GB      2357466 A   *   6/2001   ........... B60R 21/207

*Primary Examiner* — Ruth Ilan
(74) *Attorney, Agent, or Firm* — Global IP Counselors, LLP

(57) ABSTRACT

An anti-submarining seat structure includes a seat frame, upholstery, an anti-submarining device, a sensor and a controller. The upholstery overlays the seat frame at least partially forming a seat cushion portion with a cavity between the seat frame and a portion of the upholstery adjacent to a front area of the seat frame. The anti-submarining device is installed within the cavity and is configured to transition from an unactuated orientation to an actuated orientation. In the actuated orientation, the anti-submarining device forms a restraining structure proximate the front area of the seat cushion portion. The sensor is configured to detect rapid changes in acceleration and velocity of the vehicle body structure. The controller is connected to the anti-submarining device and the sensor and is configured to actuate the anti-submarining device in response to signals from the sensor indicating a rapid change in acceleration and velocity of the vehicle body structure.

12 Claims, 6 Drawing Sheets

(56) References Cited

U.S. PATENT DOCUMENTS

| | | | | |
|---|---|---|---|---|
| 10,173,558 | B1* | 1/2019 | Kondrad | B60N 2/4221 |
| 2001/0005097 | A1* | 6/2001 | Heilig | B60N 2/4221 |
| | | | | 297/452.55 |
| 2006/0267325 | A1* | 11/2006 | Kumagai | B60N 2/42718 |
| | | | | 280/753 |
| 2008/0001446 | A1* | 1/2008 | Suzuki | B60R 21/207 |
| | | | | 297/216.1 |
| 2009/0045614 | A1* | 2/2009 | Katsuda | B60N 2/42763 |
| | | | | 280/806 |
| 2009/0121457 | A1* | 5/2009 | Yoshikawa | B60N 2/42763 |
| | | | | 280/728.2 |
| 2009/0218858 | A1* | 9/2009 | Lawall | B60N 2/4235 |
| | | | | 297/216.1 |
| 2009/0289479 | A1* | 11/2009 | Kumagai | B60N 2/42763 |
| | | | | 297/216.1 |
| 2014/0291973 | A1* | 10/2014 | Nukaya | B60R 21/207 |
| | | | | 280/730.1 |
| 2017/0158096 | A1* | 6/2017 | Whitens | B60N 2/42763 |

* cited by examiner

ANTI-SUBMARINING SEAT STRUCTURE

BACKGROUND

Field of the Invention

The present invention generally relates to an anti-submarining seat structure. More specifically, the present invention relates to an anti-submarining seat structure configured to move a forward area of a seat structure upward in response to rapid change in acceleration of a vehicle.

Background Information

Recent designs of vehicle seat structures include static, non-movable elements within the seat structure that are dimensioned and positioned to limit and/or restrict forward movement of hip and upper thigh regions of a passenger during a rapid change in acceleration and velocity of a vehicle.

SUMMARY

One object of the present disclosure is to provide a vehicle seat structure with an anti-submarining device that can selectively move a forward area of the seat structure upward in response to detection of rapid changes in acceleration and velocity of a vehicle.

In view of the state of the known technology, one aspect of the present disclosure is to provide an anti-submarining seat structure with a seat frame, upholstery, an anti-submarining device, a sensor and a controller. The seat frame is installed within a vehicle body structure. The upholstery overlays the seat frame at least partially forming a seat cushion portion and further defining a cavity between the seat frame and a portion of the upholstery adjacent to a front area of the seat frame. The anti-submarining device is installed within the cavity and is configured to transition from an unactuated orientation to an actuated orientation such that in the actuated orientation the anti-submarining device forms a restraining structure proximate the front area of the seat cushion portion. The sensor is configured to detect rapid changes in acceleration and velocity of the vehicle body structure. The controller is connected to the anti-submarining device and the sensor. The controller is configured to actuate the anti-submarining device in response to signals from the sensor indicating a rapid change in acceleration and velocity of the vehicle body structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
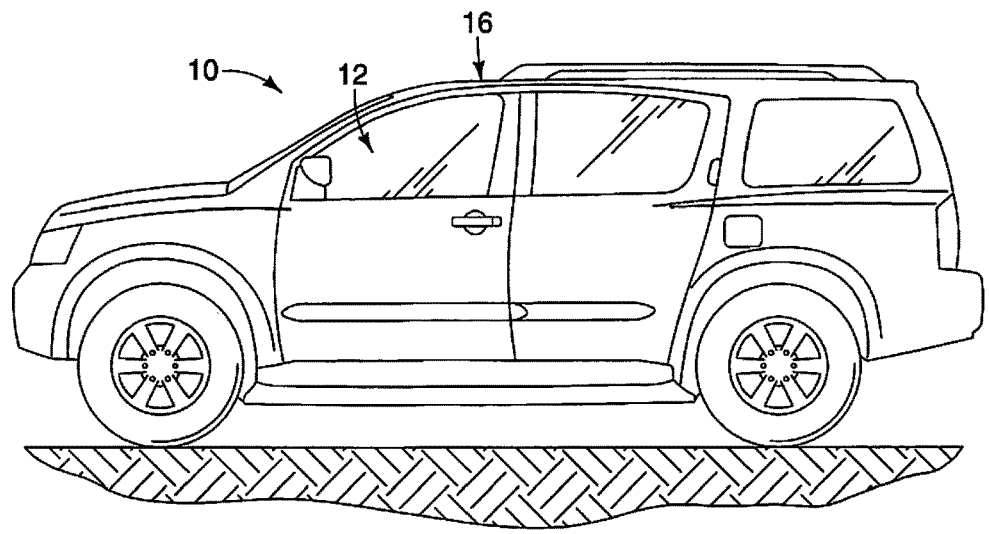
FIG. 1 is a side view of a vehicle that includes a plurality anti-submarining seat structures in accordance with a first embodiment.
Figure 2:
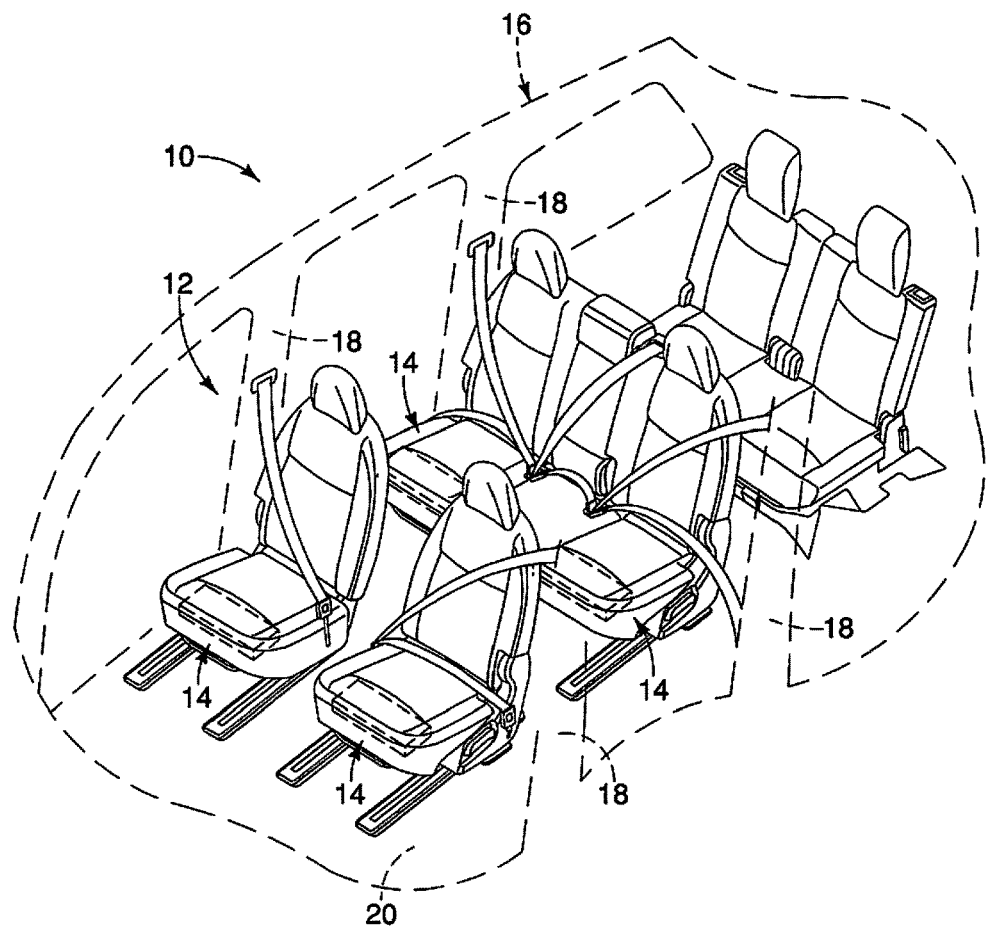
FIG. 2 is a perspective view of a passenger compartment of the vehicle depicted in FIG. 1, showing a plurality of seat assemblies, each seat assembly having an anti-submarining seat structure in accordance with the first embodiment.

Referring initially to FIG. 1, a vehicle 10 with a passenger compartment 12 is illustrated in accordance with a first embodiment. As shown in FIG. 2, the passenger compartment 12 includes a plurality of anti-submarining seat structures 14, as described in greater detail below.

The vehicle 10 further includes a body structure 16 that includes pillar structures 18 and a floor structure 20 that at least partially define the passenger compartment 12.

A plurality of anti-submarining seat structure 14 are installed within the passenger compartment 12 of the vehicle 10. Since the anti-submarining seat structures 14 are basically the same, description of only one of the anti-submarining seat structures 14 is provided below for the sake of brevity, with the description of one of the anti-submarining seat structures 14 applying equally to each of the anti-submarining seat structures 14.

Figure 9:
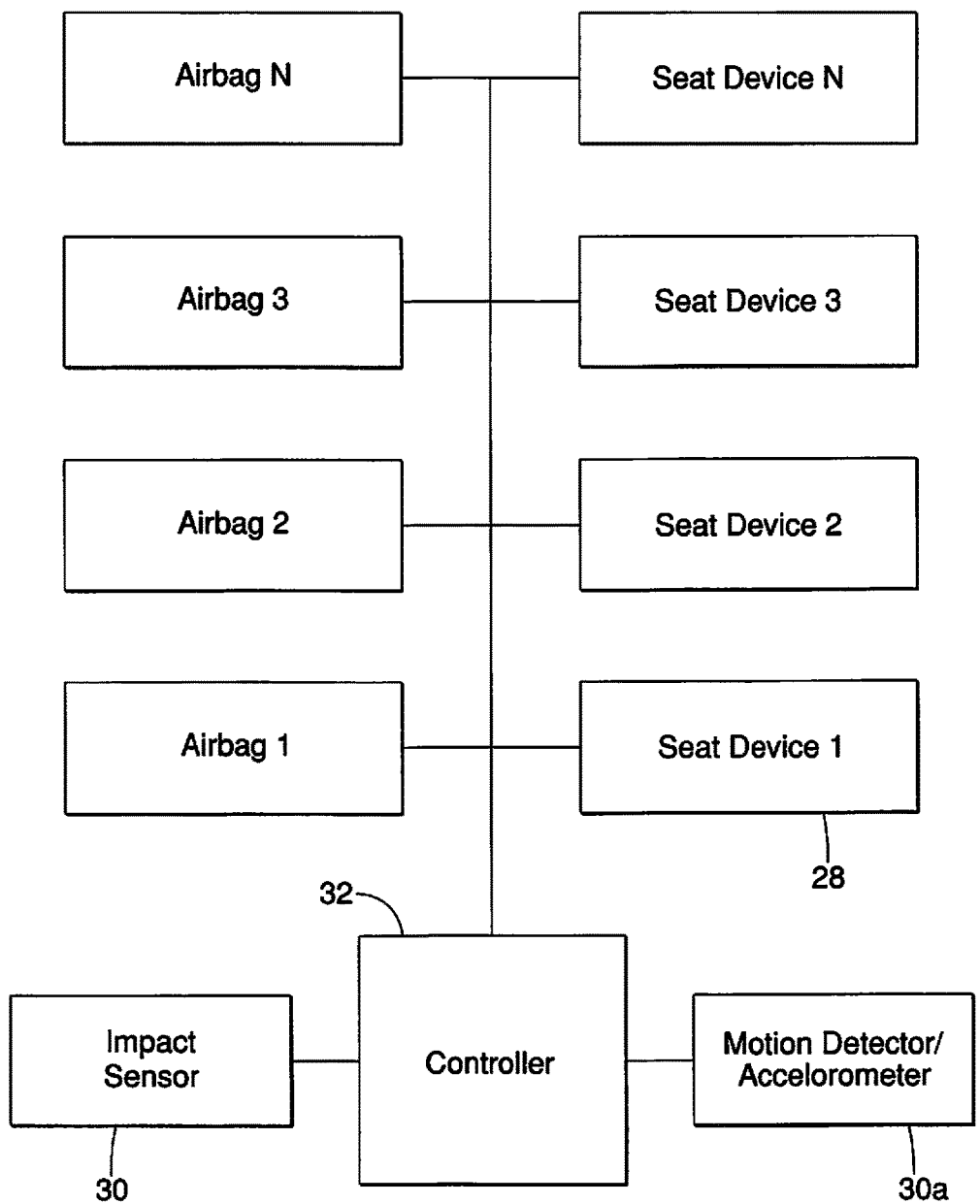
FIG. 9 is a block diagram showing a controller and sensors attached to each of the plurality of anti-submarining seat structures and to airbags in accordance with the first embodiment.

The anti-submarining seat structure 14, includes a seat frame 24, upholstery 26, an anti-submarining device 28, a sensor 30 (FIG. 9) and an electronic controller 32 (FIG. 9).

The seat frame 24 installed within the body structure 16 (vehicle body structure). The seat frame 24 is part of a seat assembly 40 that includes a seat cushion portion 42 and a seatback portion 44. The seat cushion portion 42 is mounted to the floor structure 20 and can include a conventional seat positioning mechanism. Further, a seatbelt latch mechanism 46 is installed to a side area of the seat cushion portion 42. A seatbelt assembly 48 is installed to the pillar structure 18 and includes a latch tongue 50 that can be attached and detached from the seatbelt latch mechanism 46 in a conventional manner. Since seatbelt assemblies are conventional vehicle components, further description is omitted for the sake of brevity.

The upholstery 26 is installed to the seat frame 24 in a conventional manner, except that a cavity 52 is defined between the seat frame 24 and the upholstery 26 to accommodate the anti-submarining device 28. Otherwise, the upholstery 26 covers most, if not all, of the exposed portions of the seat frame 24. In other words, the upholstery 26 overlays the seat frame 24 at least partially forming the seat cushion portion 42 and further defines the cavity 52 between the seat frame 24 and a portion of the upholstery 26 adjacent to a front area of the seat frame 24. Alternatively, the cavity 52 can be defined within the upholstery 26 itself, with the cavity 52 being located immediately above, but spaced slightly apart from the seat frame 24.

The anti-submarining device 28 is installed within the cavity 52 of the seat cushion portion 42, as shown in FIGS. 3-6. The anti-submarining device 28 is configured to deploy or transition from a stowed or unactuated orientation (FIGS. 3 and 5) to an actuated orientation (FIGS. 4 and 6) such that in the unactuated orientation, the anti-submarining device 28 is flaccid and flexible. Hence, when a passenger is seated on the seat cushion portion 42, the areas below the passenger are compressed by the weight of the passenger. In the actuated orientation, the front area of the seat cushion portion 42 is rigid resulting in exposed upper surface of the front area of the seat cushion portion 42 being lifted upward a predetermined distance from the seat frame 24.

Figure 7:
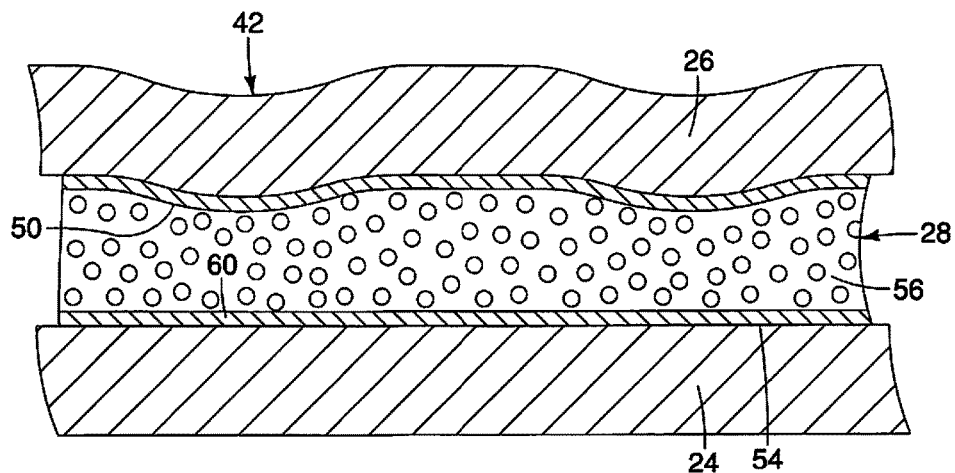
FIG. 7 is a cross-sectional view of the seat assembly depicted in FIGS. 3-6, showing magnetorheological material within the anti-submarining seat structure in the unactuated orientation in accordance with the first embodiment.
Figure 8:
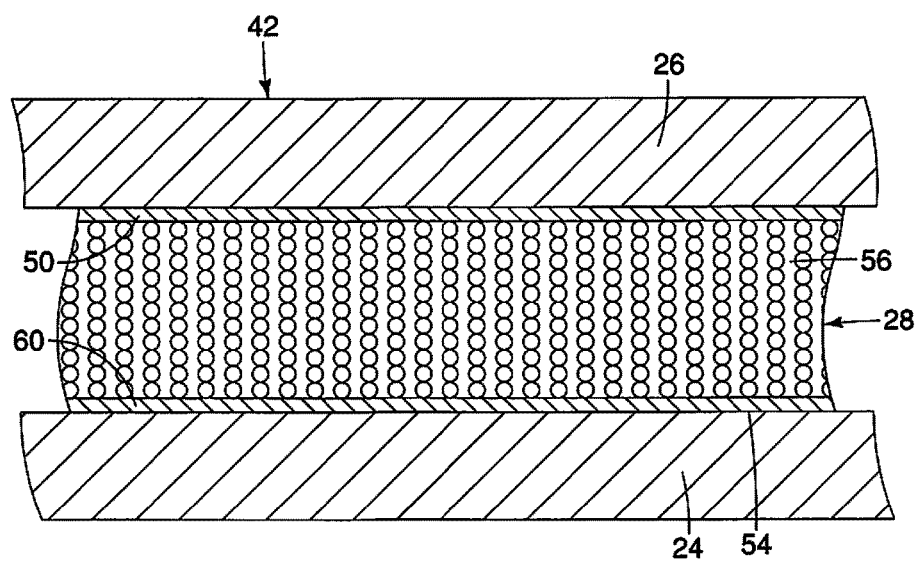
FIG. 8 is another cross-sectional view of the seat assembly similar to FIG. 7, showing the magnetorheological material within the anti-submarining seat structure in the actuated orientation in accordance with the first embodiment.

In the first embodiment, as shown in FIGS. 7 and 8, the anti-submarining device 28 includes a flexible bladder-like structure 54 filled with a magnetorheological material 56 along with a first electrode 58 (a first electromagnetic coil) and a second electrode 60 (a second electromagnetic coil). The flexible bladder-like structure 54 can be a deformable thermoplastic material, or flexible bladder that expands and can change shape upon deployment or actuation of the anti-submarining device 28. The first electrode 58 is located within the flexible bladder-like structure 54 at an upper end thereof. The second electrode 60 is located within the flexible bladder-like structure 54 at a lower end thereof, with the magnetorheological material 56 being disposed between the first electrode 58 and the second electrode 60.

The magnetorheological material 56 is a smart fluid in a carrier fluid, such as oil. When subjected to a magnetic field, the fluid greatly increases its apparent viscosity, to the point of becoming a viscoelastic solid. Importantly, the yield stress of the fluid when in its actuated orientation or "on" state can be controlled very accurately by varying the magnetic field intensity. The first electrode 58 and the second electrode 60 are configured to induce a magnetic field that extends through the magnetorheological material 56. In the absence of the magnetic field, the magnetorheological material 56 is flaccid and flexible. In the presence of a predetermined level of magnetic field density, the magnetorheological material 56 experiences an increase in viscosity and can becomes rigid and inflexible. Since magnetorheological materials are conventional materials, further description is omitted for the sake of brevity.

Figure 3:
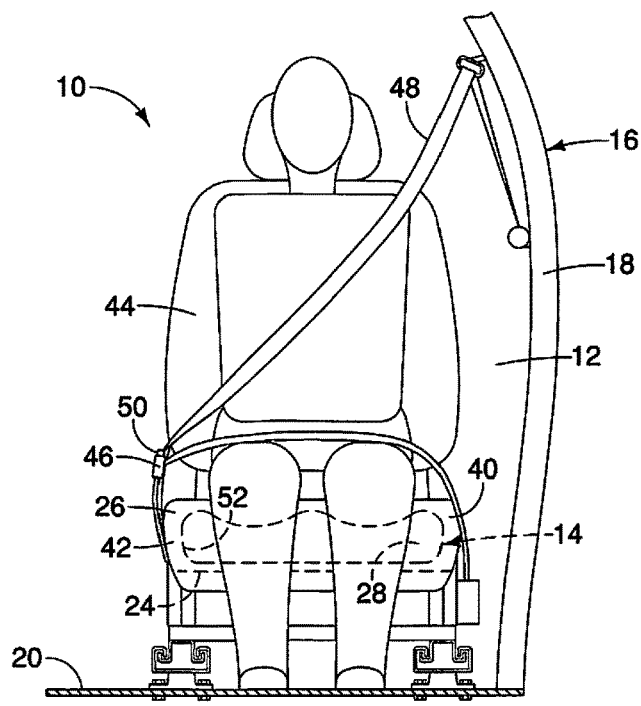
FIG. 3 is a front view of one of the seat assemblies of the vehicle depicted in FIGS. 1 and 2, showing the anti-submarining seat structure in an unactuated orientation in accordance with the first embodiment.

As shown in FIG. 7, in the absence of electric current applied to the first electrode 58 and the second electrode 60 (the first and second electromagnetic coils), the magnetorheological material 56 is in a stowed or unactuated orientation and is flexible, flaccid and elastically changes shape. Hence, the anti-submarining device 28 can conform to the overall shape of the passenger seated thereon, as indicated in FIGS. 3 and 7. Hence, the magnetorheological material 56 within the flexible bladder-like structure 54 has an overall effective height that is lower than in the actuated state shown in FIGS. 4, 6 and 8.

Figure 4:
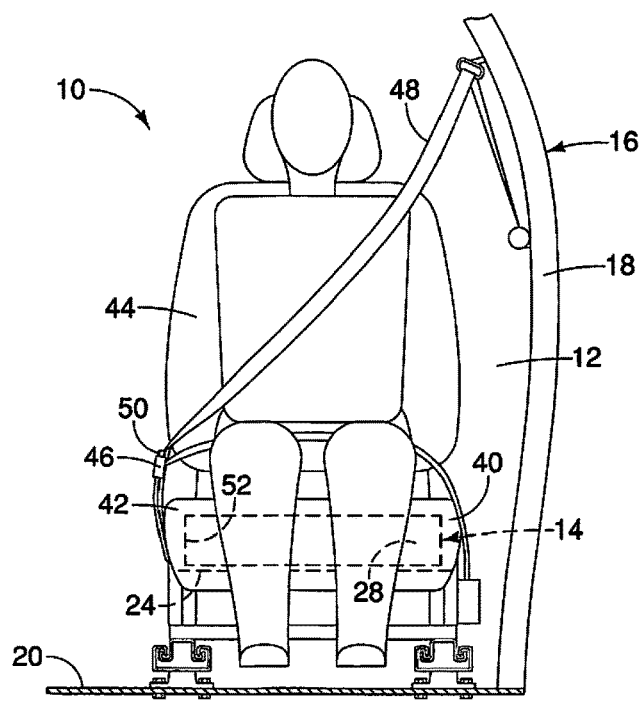
FIG. 4 is another front view similar to FIG. 3 showing the anti-submarining seat structure in an actuated orientation having moved a front area of the seat assembly upward in accordance with the first embodiment.
Figure 5:
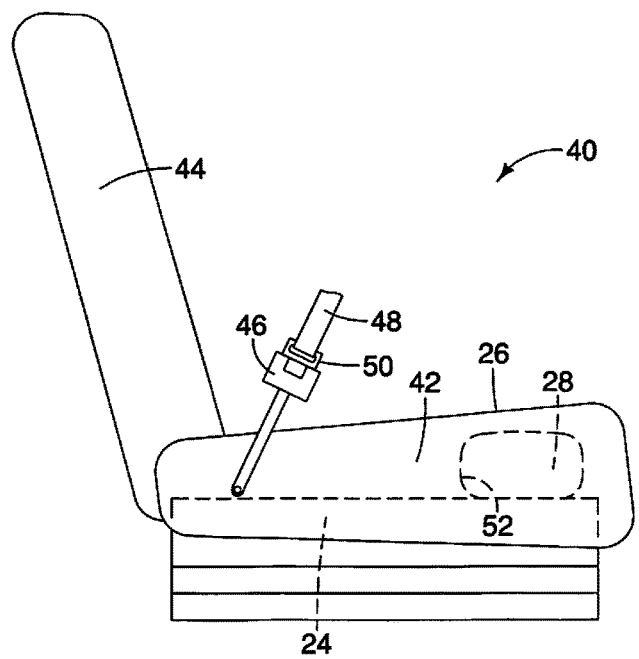
FIG. 5 is a side view of the seat assembly depicted in FIGS. 3 and 4, showing the anti-submarining seat structure in the unactuated orientation in accordance with the first embodiment.
Figure 6:
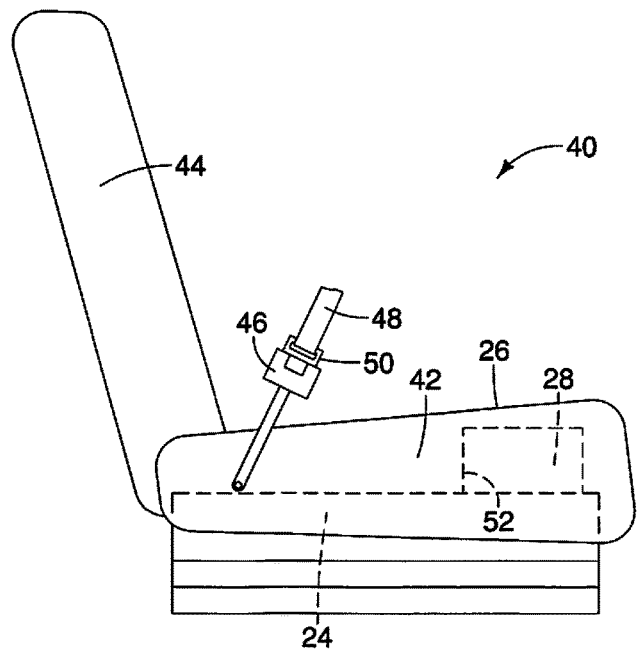
FIG. 6 is another side view similar to FIG. 5 showing the anti-submarining seat structure in the actuated orientation in accordance with the first embodiment.

FIGS. 4 and 8 show the anti-submarining device 28 in the actuated state. With current being applied to the first electrode 58 and the second electrode 60 to induce magnetic fields of force, the magnetorheological material 56 is actuated and assumes a rigid rod or beam-like that behave more like a solid material. Hence, the effective height of the flexible bladder-like structure 54 and the anti-submarining device 28 increases I response to actuation and becomes more uniform in height, as shown in FIGS. 4, 6 and 8. The magnetically susceptible particles in the magnetorheological material 56 move into alignment with the magnetic field extending therethrough and becomes rigid, thereby serving as a restraining structure (anti-submarining structure), as shown in FIG. 8.

As shown in FIG. 9, the controller 32 (an electronic controller) is connected to the sensor 30, a second sensor 30a, the anti-submarining device 28 (aka a seat device), additional anti-submarining devices (seat devices 2 through N), and airbags 1 through N.

The sensor 30 is an impact sensor that is installed within the vehicle 10 at a location near the front of the vehicle and detects whether or not the vehicle 10 has experienced an impact event. The impact event is defined as contact with a fixed object at or above a predetermined speed, for example, above a speed of 30 mph. The impact event can also be contacted another vehicle at or above the predetermined speed. The second sensor 30a can be, for example, a motion detector, an accelerometer, or other sensor that is configured to detect changes in acceleration and/or velocity. The sensor 30a is preferably further configured to detect rapid changes in acceleration and/or velocity of the vehicle 10 due to, for example, impact events, hard-braking events, or the like. A hard-braking event is a situation where the vehicle operator (not shown) abruptly hits the brake pedal (not shown) of the vehicle 10 causing the acceleration and/or velocity of the vehicle 10 to change rapidly.

The controller 32 receives signals from each of the sensor 30 and second sensor 30a and determines whether or not the detected changes in acceleration and/or velocity of the vehicle 10 meet criteria stored in memory, that justifies deploying the anti-submarining device 28 and/or the airbags 1 through N. For example, if the controller 32 determines that the change in acceleration and/or velocity of the vehicle 10 is below a predetermined threshold, then no action is taken.

If the controller 32 determines that the change in acceleration and/or velocity of the vehicle 10 is above a first predetermined threshold where there is no detected data relating to an impact event, then the controller 32 sends a deploy signal to the anti-submarining device 28 causing the anti-submarining device 28 to deploy, thereby increasing the height of a front area of the seat cushion portion 42 of the seat assembly 40 without deploying the airbags 1 through N. Further, after a predetermined time period of, for example 5-10 seconds, the controller 32 sends another signal to the anti-submarining device 28 to return to the stowed orientation, thereby reducing the height of the seat cushion portion 42 to its original height and shape.

If the controller 32 determines that the change in acceleration and/or velocity of the vehicle 10 is above the first predetermined threshold and the controller 32 determined that an impact event has occurred, then the controller 32 sends a deploy signal to the anti-submarining device 28 and to appropriate ones of the airbags 1 through N causing the anti-submarining device 28 and the appropriate ones of the airbags 1 through N to deploy simultaneously.

Further, if the controller 32 determines that the change in acceleration and/or velocity of the vehicle 10 is above a second predetermined threshold greater that the first predetermined threshold, regardless of whether or not the controller 32 has determined that an impact event has occurred, the controller 32 sends a deploy signal to the anti-submarining device 28 and to appropriate ones of the airbags 1 through N causing the anti-submarining device 28 and the appropriate ones of the airbags 1 through N to deploy simultaneously.

As used herein, the term "appropriate ones" of the airbags 1 through N refers to airbags that have been actuated. For example, if there is no passenger seated in a passenger seat of the vehicle 10, airbags that deploy to the front and side of the passenger seat are not actuated and therefore do not deploy. Hence, airbags for an unoccupied passenger seat are not "appropriate ones" of the airbags 1 through N. However, when a passenger is seated in the passenger seat, then the airbags associated with that passenger seat are actuated by the controller 32, making them "appropriate ones".

Second Embodiment

Figure 10:
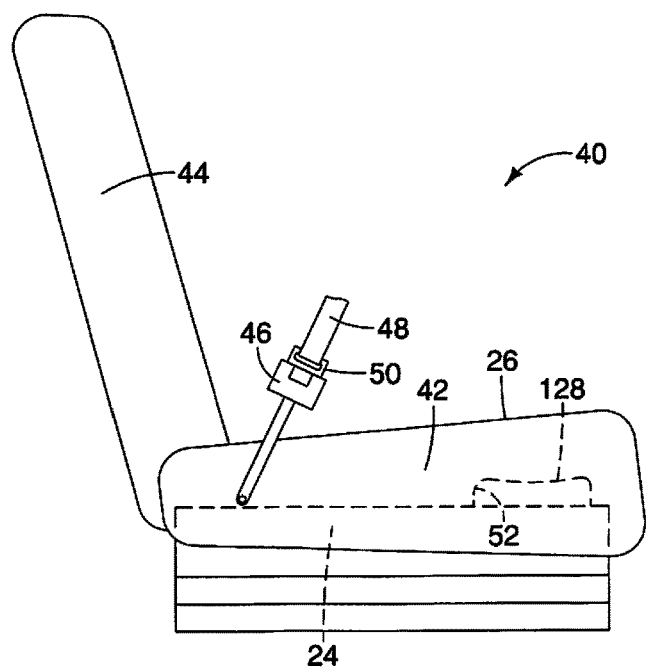
FIG. 10 is a side view of a seat assembly showing an anti-submarining seat structure in an unactuated or stowed orientation in accordance with a second embodiment.
Figure 11:
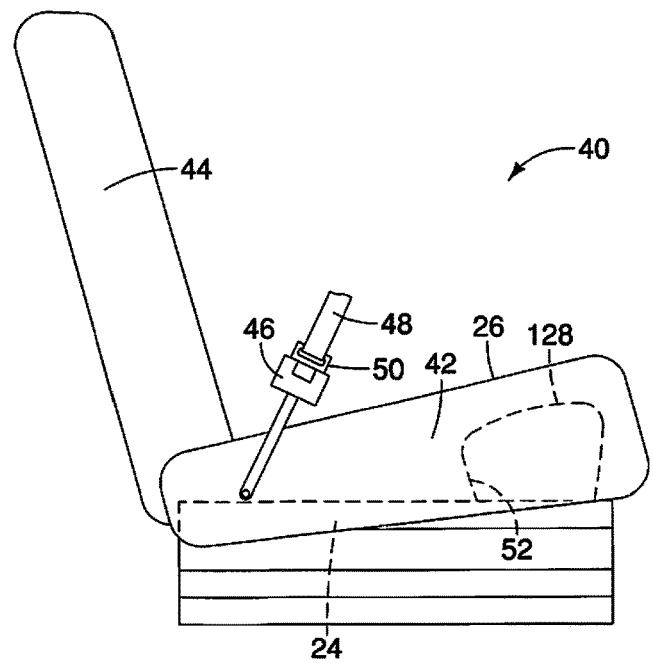
FIG. 11 is another side view of the seat assembly depicted in FIG. 10 showing the anti-submarining seat structure in an actuated or deployed orientation in accordance with the second embodiment.

Referring now to FIGS. 10 and 11, an anti-submarining device 128 within the seat assembly 40 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In FIGS. 10 and 11, the seat assembly 40 has been modified in that the anti-submarining device 28 of the first embodiment has been removed from the cavity 52 of the seat cushion portion 42, and replaced with the anti-submarining device 128. In the second embodiment, the anti-submarining device 128 can be a conventional airbag that includes a pyrotechnic device (not shown) and an inflatable structure configured to deploy in response to a deploy signal from the controller 32. In the unactuated state, the anti-submarining device 128 has a small vertical profile, as shown in FIG. 10. In the actuated or deployed state, the anti-submarining device 128 expands vertically, lifting a front area of the seat cushion portion 42, thereby defining a restraining structure (anti-submarining structure).

Alternatively, the anti-submarining device 128 can be a device similar to an airbag, but includes a deformable thermoplastic material that expands in response to deployment of a pyrotechnic device (not shown).

The controller 32 preferably includes a microcomputer with an anti-submarining device control program that controls the anti-submarining devices 28 and 128, as discussed above. The controller 32 can also include other conventional components such as an input interface circuit, an output interface circuit, and storage devices such as a ROM (Read Only Memory) device and a RAM (Random Access Memory) device. The microcomputer of the controller 32 is programmed to control the anti-submarining devices 28 and 128. The memory circuit stores processing results and control programs such as ones for anti-submarining device operation that are run by the processor circuit. The controller 32 is operatively coupled to the sensors 30 and 30a, the airbags 1 through N, and the anti-submarining devices 28 and 128 in a conventional manner. The internal RAM of the controller 32 stores statuses of operational flags and various control data. The controller 32 is capable of selectively controlling any of the components of the anti-submarining seat structure in accordance with the control program. It will be apparent to those skilled in the art from this disclosure that the precise structure and algorithms for the controller 32 can be any combination of hardware and software that will carry out the functions of the present invention.

The vehicle features, other than the anti-submarining seat structure 14, are conventional components that are well known in the art. Since vehicle features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the anti-submarining seat structure. Accordingly, these terms, as utilized to describe the present invention should be interpreted relative to a vehicle equipped with the anti-submarining seat structure.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An anti-submarining seat structure, comprising:
a seat frame installed within a vehicle body structure;
upholstery overlaying the seat frame at least partially forming a seat cushion portion and further defining a cavity between the seat frame and a portion of the upholstery adjacent to a front area of the seat frame, the cavity having an overall rectangular shape as viewed from a front side of the seat frame and a rectangular shape as viewed from a lateral side of the seat frame;
an anti-submarining device including an electrically actuatable structure filled with a magnetorheological material installed within the cavity, the magnetorheological material transitioning from an unactuated orientation to an actuated orientation in response to electrical current, in the actuated orientation the magnetorheological material of the anti-submarining device forms a rigid restraining structure proximate the front area of the seat cushion portion and in the unactuated orientation the magnetorheological material of the anti-submarining device is flaccid and flexible;
a motion detector sensor configured to detect rapid changes in acceleration and velocity of the vehicle body structure;
an impact sensor configured to detect whether or not the vehicle body structure has experienced an impact event; and
a controller connected to the anti-submarining device, the motion detector sensor and the impact sensor, the controller being configured to actuate the anti-submarining device in response to signals from the motion detector sensor and the impact sensor corresponding to one of hard braking or of an impact event of the vehicle body structure causing the anti-submarining device change to the actuated orientation, and after a predetermined period of time issuing another signal causing the anti-submarining device to return to the unactuated orientation.

2. The anti-submarining seat structure according to claim 1, wherein the unactuated orientation is a stowed orientation, the actuated orientation is an expanded orientation, and the expanded orientation includes the anti-submarining device lifting the front area of the seat cushion upward a predetermined distance from the seat frame.

3. The anti-submarining seat structure according to claim 1, wherein
the motion detector sensor is an accelerometer.

4. The anti-submarining seat structure according to claim 1, further comprising:
at least one airbag installed within the vehicle body structure proximate the seat cushion portion and being connected to the controller, and
the controller is configured to deploy the at least one airbag and the anti-submarining device simultaneously in response to determining that the signals from the motion detector sensor and the impact sensor correspond to an impact event.

5. The anti-submarining seat structure according to claim 4, wherein
the controller is further connected to a plurality of anti-submarining devices and a plurality of airbags and is configured to deploy the plurality of airbags and the plurality of anti-submarining device simultaneously in response to determining that the signals from the motion detector sensor and the impact sensor correspond to an impact event.

6. The anti-submarining seat structure according to claim 4, wherein
the controller is configured to actuate the anti-submarining device in response to determining that the vehicle is experiencing a hard-braking event.

7. The anti-submarining seat structure according to claim 6
wherein the controller is configured to actuate the anti-submarining device in response to determining that the vehicle is experiencing the hard-braking event without deploying the at least one airbag.

8. The anti-submarining seat structure according to claim 1, further comprising
a plurality of airbags with at least one of the plurality of airbags being located forward of a passenger seat and at least another of the plurality of airbags being located along a side of the passenger seat, and
the controller further configured to actuate the plurality of airbags and the anti-submarining device in response to the signals from the motion detector sensor and the impact sensor corresponding to an impact event.

9. The anti-submarining seat structure according to claim 8, wherein
the controller configured to actuate the anti-submarining device in response to signals from the motion detector sensor and the impact sensor corresponding to hard braking and not an impact event, and not deploy the plurality of airbags in response to determining that the signals from the motion detector and the impact sensor do not correspond to an impact event.

10. The anti-submarining seat structure according to claim 1, wherein
the anti-submarining device has an overall shape corresponding to the shape of the cavity in the unactuated orientation.

11. An anti-submarining seat structure, comprising:
a seat frame installed within a vehicle body structure;
upholstery overlaying the seat frame at least partially forming a seat cushion portion and further defining a cavity between the seat frame and a portion of the upholstery adjacent to a front area of the seat frame;
an anti-submarining device installed within the cavity, the anti-submarining device including an electrically actuatable structure filled with a magnetorheological material that is configured to transition from an unactuated orientation to an actuated orientation such that in the unactuated orientation the magnetorheological material is flaccid and flexible and in the actuated orientation the magnetorheological material is rigid such that the anti-submarining device forms a rigid restraining structure within the cavity;
a motion detector sensor configured to detect rapid changes in acceleration and velocity of the vehicle body structure;
an impact sensor configured to detect whether or not the vehicle body structure has experienced an impact event;

a plurality of airbags with at least one of the plurality of airbags being located forward of a passenger seat and at least another of the plurality of airbags being located along a side of the passenger seat; and a controller connected to the anti-submarining device, the motion detector sensor and the impact sensor, the controller being configured to actuate only the anti-submarining device in response to signals from the motion detector sensor and the impact sensor corresponding to a hard braking event acting on the vehicle body structure, the controller further configured to actuate the plurality of airbags and the anti-submarining device in response to the signals from the motion detector sensor and the impact sensor corresponding to an impact event, the controller further being configured to de-actuate the anti-submarining device after a predetermined period of time after actuation of the anti-submarining device such that the anti-submarining device returns to the unactuated orientation;

wherein the cavity within the upholstery overlaying the seat frame has an overall rectangular shape as viewed from a front side of the seat frame and a rectangular shape as viewed from a lateral side of the seat frame, and the anti-submarining device has an overall shape corresponding to the shape of the cavity in the unactuated orientation.

12. The anti-submarining seat structure according to claim 11, wherein the anti-submarining device includes the magnetorheological material, a first electrode and a second electrode, the first and second electrodes being connected to the controller.

\* \* \* \* \*